(12) United States Patent
Watkins et al.

(10) Patent No.: US 8,526,930 B2
(45) Date of Patent: Sep. 3, 2013

(54) ENHANCED SMARTPHONE IN-VEHICLE ACCOMMODATION

(75) Inventors: Gary A. Watkins, Royal Oak, MI (US); Richard C. Vanitvelt, Metamora, MI (US); Leonard C. Nieman, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 238 days.

(21) Appl. No.: 13/178,039

(22) Filed: Jul. 7, 2011

(65) Prior Publication Data

US 2013/0012179 A1  Jan. 10, 2013

(51) Int. Cl.
*H04M 3/00* (2006.01)

(52) U.S. Cl.
USPC .......................................................... 455/418

(58) Field of Classification Search
USPC .......................................................... 455/418
See application file for complete search history.

(56) References Cited

U.S. PATENT DOCUMENTS

| | | | | |
|---|---|---|---|---|
| 2004/0203672 A1* | 10/2004 | Crocker et al. | | 455/415 |
| 2005/0216902 A1* | 9/2005 | Schaefer | | 717/168 |
| 2009/0054049 A1* | 2/2009 | Crawley et al. | | 455/418 |
| 2009/0156126 A1* | 6/2009 | Willis | | 455/41.3 |
| 2010/0069001 A1* | 3/2010 | Arndt et al. | | 455/41.1 |
| 2010/0245123 A1* | 9/2010 | Prasad et al. | | 340/870.41 |
| 2010/0273422 A1* | 10/2010 | Garrett et al. | | 455/41.2 |
| 2011/0105198 A1* | 5/2011 | Grivas et al. | | 455/569.2 |
| 2011/0258221 A1* | 10/2011 | Furuta | | 707/769 |
| 2012/0142367 A1* | 6/2012 | Przybylski | | 455/456.1 |
| 2012/0172012 A1* | 7/2012 | Sumcad et al. | | 455/414.1 |
| 2012/0322441 A1* | 12/2012 | Hirano et al. | | 455/426.1 |

* cited by examiner

*Primary Examiner* — Nathan Mitchell
(74) *Attorney, Agent, or Firm* — Anthony L. Simon; Reising Ethington P.C.

(57) ABSTRACT

A system and method for configuring communications between a wireless device and a vehicle telematics unit over a short-range wireless communication link includes receiving a serial port profile (SPP) software application at a wireless device from a central facility; storing the SPP software application at the wireless device; identifying third-party software applications stored on the wireless device using the SPP software application; sending the identity of the third-party software applications to the central facility; and communicating between the wireless device and a vehicle telematics unit via a short-range wireless communication link using the stored SPP software application and data transmitted using one or more software templates that have been received by the vehicle telematics unit in response to the identity of the third-party software applications sent.

20 Claims, 2 Drawing Sheets

ENHANCED SMARTPHONE IN-VEHICLE ACCOMMODATION

TECHNICAL FIELD

The present invention relates generally to vehicles and more particularly to facilitating the configuration of communications between a wireless device and a vehicle telematics unit over a short-range wireless communication link.

BACKGROUND OF THE INVENTION

Modern vehicles offer vehicle occupants the ability to send and receive wireless communications. And modern vehicles can do so in a variety of ways. For example, a vehicle can include a telematics unit that uses cellular communication systems to place and receive telephone calls or to communicate data with a central facility. In addition to communications using cellular systems, the telematics unit can also use short-range wireless communication capabilities as well, such as WiFi or Bluetooth. Short range wireless communication capabilities permit the vehicle telematics unit to communicate with similarly-configured devices within a predetermined distance from the vehicle telematics unit.

But vehicle occupants are not solely reliant on vehicle telematics units to carry out wireless communications. Often, vehicle occupants carry a wireless device, such as a smartphone, that has the capability to send/receive cellular communications even though the vehicle may also be able to similarly communicate. These types of wireless devices are also frequently able to download and operate a wide variety of software applications—sometimes created by third-party developers—that are operated by the devices to provide more features to the user. Given the frequent proximate presence of both the vehicle telematics unit and the wireless device, it would be beneficial to more effectively integrate the capabilities of both of these devices.

SUMMARY OF THE INVENTION

According to an aspect of the invention, there is provided a method of configuring communications between a wireless device and a vehicle telematics unit over a short-range wireless communication link. The method includes receiving a serial port profile (SPP) software application at a wireless device from a central facility; storing the SPP software application at the wireless device; identifying third-party software applications stored on the wireless device using the SPP software application; sending the identity of the third-party software applications to the central facility; and communicating between the wireless device and a vehicle telematics unit via a short-range wireless communication link using the stored SPP software application and data transmitted using one or more software templates that have been received by the vehicle telematics unit in response to the identity of the third-party software applications sent.

According to another aspect of the invention, there is provided a method of facilitating the configuration of communications between a wireless device and a vehicle telematics unit over a short-range wireless communication link. The method includes receiving a request at a central facility to provide a serial port profile (SPP) software application to a wireless device; transmitting the SPP software application to the wireless device; receiving at the central facility identities generated by the SPP software application of one or more third-party software applications stored on the wireless device; comparing the received identities with a plurality of software templates used to communicate data between a vehicle telematics unit and the wireless device via a short range wireless communication link; determining if the received identities match at least one of the plurality of software templates; and if so, transmitting the matched software template to the vehicle telematics unit.

According to yet another aspect of the invention, there is provided a method of configuring communications between a wireless device and a vehicle telematics unit over a short-range wireless communication link. The method includes sending from a wireless device to a central facility a request for a serial port profile (SPP) software application; receiving the SPP software application at the wireless device from the central facility; identifying one or more third-party software applications resident on the wireless device using the received SPP software application; sending the identity of the third-party software applications from the wireless device to the central facility; searching for one or more software templates that correspond with the identity of the third-party software applications and that are used for communicating between the wireless device and a vehicle telematics unit via a short-range wireless communication link; if one or more software templates correspond with the identity of the third-party software applications, then transmitting the software templates from the central facility to a vehicle that is associated with the wireless device; receiving and storing the transmitted software templates at the vehicle; and initiating a communication session between the vehicle and the wireless device for operating the third-party software applications using the SPP software application and the transmitted software templates.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
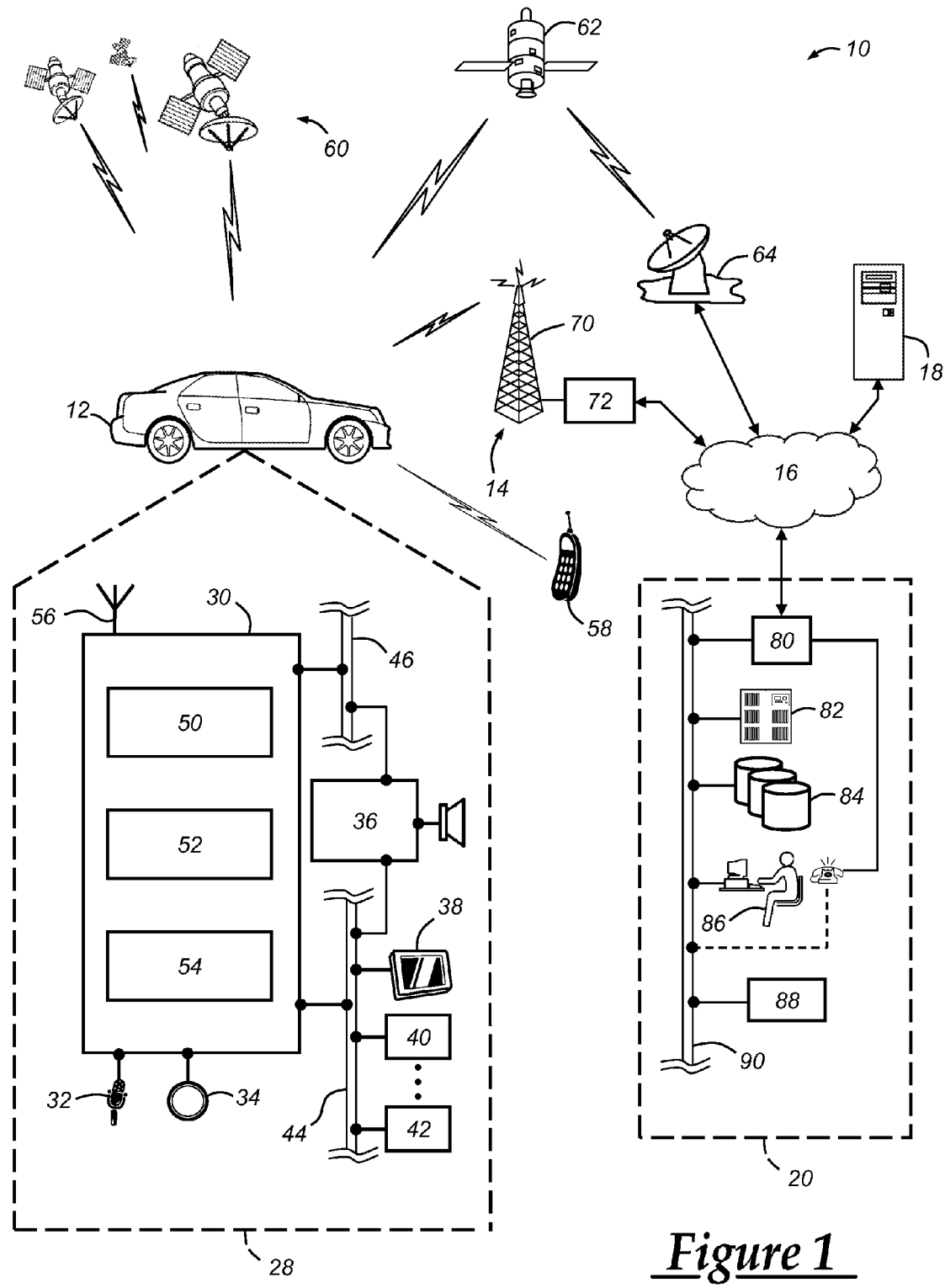
FIG. 1 is a block diagram depicting an exemplary embodiment of a communications system that is capable of utilizing the method disclosed herein.

The system and method described below facilitates communications between a vehicle telematics unit and a wireless device. More specifically, the system and method can enhance the functionality of wireless devices, such as a smartphones, that frequently operate third-party software applications (often referred to as "apps") stored on the wireless device. A short-range wireless link between the wireless device and the telematics unit can exchange data for integrating at least a portion of the third-party software application functionality with the telematics unit. That way, vehicle occupants having wireless devices can operate third-party software using the hardware of the vehicle.

This can be accomplished by providing a software application to the wireless device that can translate communications from third-party software applications resident on the device so that they can be understood by the vehicle telematics unit. At the same time the software application provided to the wireless device can also translate communications from the vehicle telematics unit sent to the device in such a way that third-party software applications can interpret and/or operate using those communications.

A counterpart to the software application provided to the wireless device can be used at the vehicle telematics unit. The software application used at the vehicle telematics unit can send/receive the communications to/from the wireless device. Like the software provided to the wireless device, the software used by the vehicle telematics unit can translate data and/or communications generated by third-party software applications stored on the wireless device into computer-readable instructions that can be acted on by the vehicle telematics unit. In effect, the software applications at each of the vehicle telematics unit and the wireless device act as "brokers" that translate or interpret commands from third-party software in such a way that both devices can communicate. This is helpful because not only do wireless devices use a variety of different operating systems, each operating system may function with a spectacular array of different third-party software applications.

For instance, examples of smartphone operating systems include iOS (used by Apple's iPhone™) and Android (a variety of smartphones). Each of these operating systems is serviced by web portals for purchasing third-party software applications (e.g. "app store(s)"). Given the wide variety of different third-party software applications, it is possible to create a plurality of different software applications, such as software templates, for the vehicle telematics unit, each of which may be compatible with one or more third-party software applications. That way, the software application provided to the wireless device can identify the third-party software resident on the wireless device and provide the identity or identities to a central facility. Depending on the third-party software stored at the wireless device, the central facility can determine one or more different software templates for the vehicle telematics unit and send the software templates to the vehicle.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. When used for packet-switched data communication such as TCP/IP, the telematics unit can be configured with a static IP address or can set up to automatically receive an assigned IP address from another device on the network such as a router or from a network address server. Wireless networking between the vehicle and other networked wireless devices can also be carried out using telematics unit 30. For this purpose, telematics unit 30 can be configured to communicate wirelessly according to one or more wireless protocols, such as any of the IEEE 802.11 protocols, WiMAX, or Bluetooth. Vehicle occupants can carry wireless devices 58 that communicate with the telematics unit 30 via a short range wireless link using the wireless protocols described above. Examples of wireless devices 58 include mobile phones (for example, smartphones such as the iPhone™ made by Apple), tablet computers, such as the iPad™ also made by Apple, or other similar devices having a short-range wireless antenna and operating third-party software applications.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third-party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
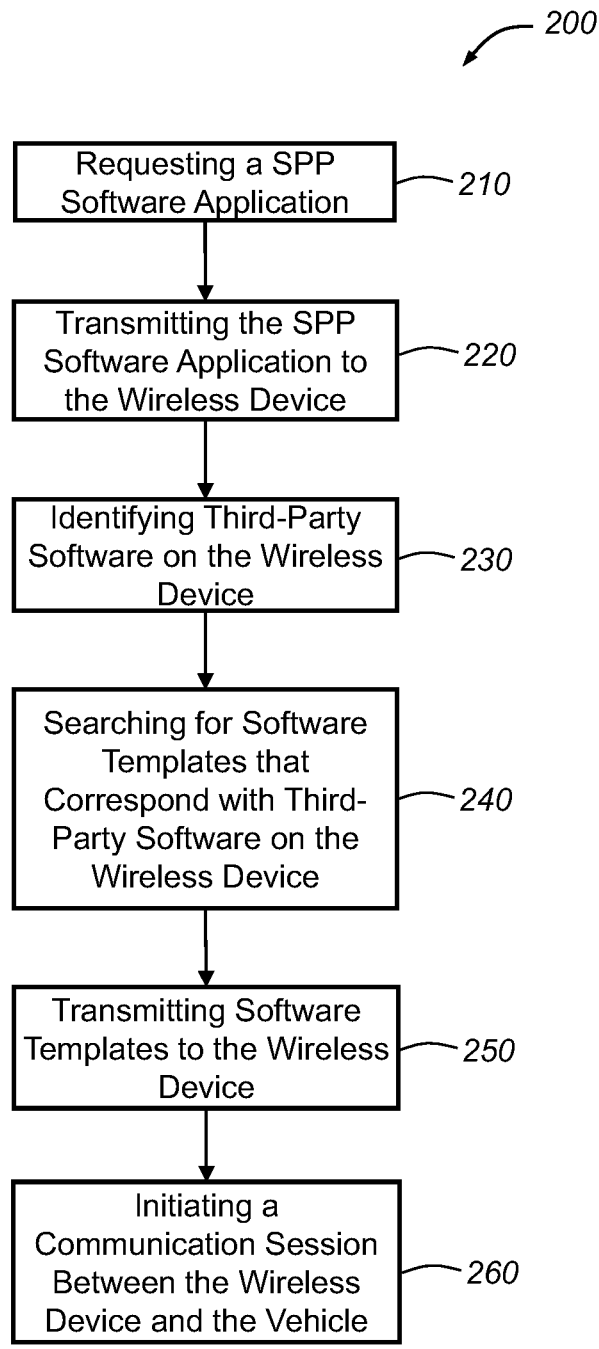
FIG. 2 is a flow chart of a method of configuring communications between a wireless device and a vehicle telematics unit over a short-range wireless communication link.

Turning now to FIG. 2, there is shown a method 200 of configuring communications between the wireless device 58 and the vehicle telematics unit 30 over a short-range wireless communication link. The method 200 begins at step 210 by sending from the wireless device 20 to a central facility a request for a serial port profile (SPP) software application, which can be received at the central facility. SPP software can be stored at the wireless device 58 and used to control a number of operations. First, the SPP software can be used on the application layer of a software stack in the wireless device 58 to initiate a short-range wireless link via Bluetooth radio frequency communication protocols (RFCOMM). The RFCOMM protocols can emulate serial port connections and the SPP software can be configured to communicate with the telematics unit 30 using these protocols. The SPP software application can translate communications sent/received over the short-range wireless link. In addition, the SPP software can be enabled to scan the memory devices to identify any third-party applications stored at the wireless device 58. When doing so, the SPP software can be directed to prepare a list of the third-party software application identities for transmission to the central facility. This will be discussed in more detail below.

Third-party software applications can generally be described as using the software/hardware capabilities of the wireless device 58 to provide the user of the device 58 some type of service or entertainment. Often, the third-party software applications facilitate using the functionality of a particular website at the wireless device 58. And the third-party software applications can be created for the wireless device 58 in its native language using software development kits, such as the iOS SDK that is used for third-party software applications intended for Apple's iPhone™. Examples of third-party software applications include mobile phone software applications for pandora.com, the nytimes.com, or gasbuddy.com, to name a few. The third-party software applications can be provided to the wireless device 58 over the wireless carrier system 14 via digital distribution platforms, which include operating system native platforms (e.g. Google's Android Market and the Apple's App Store) as well as third-party platforms (e.g. Amazon Appstore and Verizon Wireless VZAppZone).

The request for SPP software can be received at the central facility, such as call center 20 shown in FIG. 1. Or in another example, the request can be placed from the wireless device 58 to computer 18 through the wireless carrier system 14 in such a way that the wireless device 58 has the capability to wirelessly access a web portal that offers downloadable software. This way, a vehicle occupant using the wireless device 58 can connect with computer 18 or other provider of downloadable software, such as a web portal/digital distribution platform (e.g. "app store"), and request the SPP software application. The "app store" may be owned by a vehicle manufacturer, a wireless device manufacturer, or other entity involved in providing service and/or software applications to the wireless device 58. The method proceeds to step 220.

At step 220, the SPP software application is transmitted to the wireless device 58 from the central facility and the SPP software application is received at the wireless device 58. The SPP software application can be transmitted to the wireless device 58 through the wireless carrier system 14. In one example, the transmission can originate from its source (e.g. computer 18, call center 20, or other central facility) and pass through the wireless carrier system 14 directly to the wireless device 58. Also, the transmission of SPP software application can flow from its source through the wireless carrier system 14 to the telematics unit 30 and the wireless device 58 can receive the SPP software application from the telematics unit 30 over a short-range wireless link between device 58 and telematics unit 30. It should also be appreciated that the wireless device 58 can receive the SPP software application through a link to a personal computer (PC) connected to the Internet. In this case, the vehicle occupant can download the SPP software application from a web portal using the PC. The vehicle occupant can then transfer the SPP software application from the PC to the wireless device 58 via a communicative link to the wireless device 58, such as a universal serial bus (USB) cable or a Bluetooth link. The SPP software application can then be stored at the wireless device 58. The method 200 proceeds to step 230.

At step 230, third-party software applications resident on the wireless device are identified using the received SPP software application. As noted above, the SPP software application not only can translate the content of short-range wireless communications between the wireless device 58 and the telematics unit 30, but the SPP software application can also be used to learn which third-party software applications are operated or stored on the wireless device 58. For instance, the SPP software application can include a list of third-party software application identifiers it is instructed to search for. Once the SPP software application is installed and/or run by the wireless device 58, the SPP software application can compare the third-party software application identifiers (e.g. version numbers) stored on the wireless device 58 with third-party software application identifiers included with the list. If the comparison yields one or more matches between the third-party software application identifiers included on the list and third-party software applications stored on the wireless device 58, then the identities of third-party software applications stored on the wireless device 58 that match the identifiers the SPP software was instructed to search for can be sent from the wireless device 58 to the central facility. And the identities of the third-party software applications can be sent to the central facility the same way(s) that the SPP software application was sent to the wireless device 58. The identities of the third-party software applications can then be received at the central facility. The method 200 proceeds to step 240

At step 240, one or more software templates are searched to determine if the software templates correspond with the identity of the third-party software applications. These software templates can be used for communicating between the wireless device 58 and a vehicle telematics unit 30 via a short-range wireless communication link. Software templates can be developed to correspond to each third-party software application or a group of third-party software applications. In general, the software templates can translate data communicated between the wireless device 58 and the telematics unit 30. The software templates can be generated for use with a particular third-party software application and facilitate access to vehicle data, such as the data generated by VSM 42. It is possible that the software templates are created to emulate the appearance of the website associated with the third-party software application used with the software template. It is also possible that the software template may have additional vehicle-specific features. These concepts may be further explained by way of a non-limiting example.

For instance, if the wireless device 58 stored the third-party software application for gasbuddy.com, a software template may exist for use with the gasbuddy.com application. By way of background, gasbuddy.com is a website that can identify the price of fuel within a geographic area and inform users of the least expensive fuel. The wireless device 58 can use the third-party software application for gasbuddy.com to determine the price of fuel in an area—potentially the area in which the wireless device 58 is presently located. The software template corresponding to the gasbuddy.com third-party software application can be specifically-created using a software development kit for software templates. It is also possible to create a generic software template for the gasbuddy.com third-party software application that is also compatible with other third-party software applications, using the software development kit. The software templates can be developed using a variety of languages, including HTML5.

In addition, the software template corresponding to gasbuddy.com can enhance the functionality of that third-party software application by using it with vehicle data. For example, the vehicle 12 can include a VSM 42 that monitors the fuel level of the vehicle 12. When the fuel level of the vehicle 12 drops below a predetermined point, the telematics unit 30 can send data to the wireless device 58 alerting the gasbuddy.com third-party software application of the low-level fuel condition via the short-range wireless link. In response, the third-party software application can display the vehicle range before running out of fuel based on the vehicle data and also display a map of fuel stations and fuel costs per unit volume. This is an example of one third-party software application and one software template. However, it is possible that more than one third-party software application will be identified on the wireless device 58 and more than one software template will be identified as corresponding to one or more third-party software applications.

A database that correlates third-party software applications and software templates can be maintained at the central facility, which can carry out computer-generated searches to identify the software templates that are appropriate for a particular wireless device 58. Ultimately, a list of software templates that correspond to the third-party software resident on the wireless device 58 can be generated thereby controlling which software templates the vehicle 12 should receive for connecting with the wireless device 58 over the short-range wireless link. The method 200 proceeds to step 250.

At step 250, software templates are transmitted from the central facility to a vehicle 12 that is associated with the wireless device 58 if one or more software templates correspond with the identity of the third-party software applications. The corresponding software templates can be associated with one or more vehicles 12 that are used by the wireless device 58 user. For example, the SPP application can query the user of the wireless device 58 to identify the vehicle(s) 12 that should receive the software templates. In another example, the user of the wireless device 58 can register the device 58 along with one or more vehicles 12 at a web portal that can be maintained by a telematics service provider so that the SPP application can automatically identify which vehicles 12 will receive the software templates. The software templates identified during step 240 can be accessed from a source that stores the software templates (e.g. the central facility) and wirelessly transmitted to the proper vehicle 12, such as via the wireless carrier system 14 or short-range wireless communications technology. The transmitted software templates can be received at the vehicle 12 using the telematics unit 30 and ultimately stored at the vehicle 12 for future use. The method 200 proceeds to step 260.

At step 260, a communication session is initiated between the vehicle 12 and the wireless device 58 for operating the third-party software applications using the SPP software application and the transmitted software templates. The communications session can be initiated automatically when the user of the wireless device 58 launches a third-party software application. At that time, the wireless device 58 can detect if the telematics unit 30 is able to communicate wirelessly with the device 58 over the short-range wireless link. If so, the wireless device 58 can launch the SPP software application. The SPP software application can begin establishing the short-range wireless communication link using Bluetooth serial port profile (BT SPP) between the wireless device 58 and the telematics unit 30. Once the telematics unit 30 receives a request to establish the BT SPP, it can call up a software application for communicating with the SPP application resident on the wireless device 58. This can be called the SPP aggregator and can be tasked with brokering/translating communications with the SPP software application used by the wireless device 58 as well as managing the software templates stored at the vehicle 12. In one example, the SPP aggregator can be integrated with a software template. In another example, the SPP aggregator and the software templates are separate and distinct software programs whereby the SPP aggregator can manage the software templates. The SPP aggregator may be installed on the vehicle telematics unit 30 when the vehicle 12 is manufactured. However, it can be determined that the vehicle 12 does not have the SPP aggregator and it can be wirelessly sent to the vehicle 12 along with the software templates. Using the SPP software application located at the wireless device 58 and the SPP aggregator located at the vehicle 12, the short-range wireless link can be established (e.g. BT SPP) and data and commands are translated and communicated between the wireless device 58 and the telematics unit 30 over the link While the SPP software application and the SPP aggregator can broker communications between the wireless device 58 and the telematics unit 30, both the SPP software application and the SPP aggregator may be part of the application layer of the software stack. The software that carries out instructions for maintaining the short-range wireless link may be implemented in a different part of the stack, such as the session layer or presentation layer.

After the short-range communication link is established (e.g. via launching a particular third-party software application), the telematics unit 30 can select the appropriate software template for use with the launched third-party software application. In addition, the third-party software application can be controlled via the telematics unit 30 or the wireless device 58. For example, the display 38 of the vehicle 12 can include a touch-screen display on which a plurality of selections can be generated. By pressing the displayed selections, the vehicle occupant can send commands from the telematics unit 30 through the SPP aggregator and SPP software application to the wireless device 58 and ultimately direct the third-party software application based on the sent commands. The method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of configuring communications between a wireless device and a vehicle telematics unit over a short-range wireless communication link, comprising the steps of:
   (a) receiving a serial port profile (SPP) software application at a wireless device from a central facility;
   (b) storing the SPP software application at the wireless device;
   (c) identifying third-party software applications stored on the wireless device using the SPP software application;
   (d) sending the identity of the third-party software applications to the central facility; and
   (e) communicating between the wireless device and a vehicle telematics unit via a short-range wireless communication link using the stored SPP software application and data transmitted using one or more software templates that have been received by the vehicle telematics unit in response to the identity of the third-party software applications sent during step (d).

2. The method of claim 1, further comprising the steps of: storing a software aggregator at the vehicle for translating data sent to and received from the wireless device; and displaying data sent from the wireless device using one or more of the received software templates.

3. The method of claim 2, further comprising the step of selecting the software templates at the direction of the software aggregator based on data communications received via the SPP software application.

4. The method of claim 1, further comprising the step of receiving the SPP software application at the wireless device from a personal computer (PC) through a wired communication link.

5. The method of claim 1, further comprising the step of receiving the SPP software application at the wireless device from a personal computer (PC) through a short-range wireless communication link between the PC and the wireless device.

6. The method of claim 1, wherein the SPP software application includes a list of third-party software applications that have corresponding software templates.

7. The method of claim 1, further comprising the step of translating data generated by one or more third-party software applications using the SPP software for transmission to the vehicle telematics unit over the short-range wireless link.

8. The method of claim 1, further comprising the step of controlling one or more third-party software applications on the wireless device via the short-range wireless link using the SPP software application and one or more software templates.

9. A method of facilitating the configuration of communications between a wireless device and a vehicle telematics unit over a short-range wireless communication link, comprising the steps of:
   (a) receiving a request at a central facility to provide a serial port profile (SPP) software application to a wireless device;
   (b) transmitting the SPP software application to the wireless device;
   (c) receiving at the central facility identities generated by the SPP software application of one or more third-party software applications stored on the wireless device;
   (d) comparing the received identities with a plurality of software templates used to communicate data between a vehicle telematics unit and the wireless device via a short range wireless communication link;
   (e) determining if the received identities match at least one of the plurality of software templates; and
   (f) if so, transmitting the matched software template to the vehicle telematics unit.

10. The method of claim 9, further comprising the step of transmitting a software aggregator to the vehicle telematics unit for translating data sent to and received from the wireless device.

11. The method of claim 9, further comprising the step of transmitting the SPP software to a personal computer (PC).

12. The method of claim 9, wherein the SPP software application includes a list of third-party software applications that have corresponding software templates.

13. The method of claim 9, further comprising the step of associating the wireless device with one or more vehicles.

14. A method of configuring communications between a wireless device and a vehicle telematics unit over a short-range wireless communication link, comprising the steps of:
   (a) sending from a wireless device to a central facility a request for a serial port profile (SPP) software application;
   (b) receiving the SPP software application at the wireless device from the central facility;
   (c) identifying one or more third-party software applications resident on the wireless device using the received SPP software application;
   (d) sending the identity of the third-party software applications from the wireless device to the central facility;
   (e) searching for one or more software templates that correspond with the identity of the third-party software applications and that are used for communicating between the wireless device and a vehicle telematics unit via a short-range wireless communication link;
   (f) if one or more software templates correspond with the identity of the third-party software applications, then transmitting the software templates from the central facility to a vehicle that is associated with the wireless device;
   (g) receiving and storing the transmitted software templates at the vehicle; and
   (h) initiating a communication session between the vehicle and the wireless device for operating the third-party software applications using the SPP software application and the transmitted software templates.

15. The method of claim 14, further comprising the steps of:
   storing a software aggregator at the vehicle for translating data sent to and received from the wireless device; and
   displaying data sent from the wireless device using one or more of the transmitted software templates.

16. The method of claim 15, further comprising selecting the one or more software templates at the direction of the software aggregator based on data communications received via the SPP software application.

17. The method of claim 14, further comprising the step of receiving the SPP software at the wireless device from a personal computer (PC) through a wired communication link.

18. The method of claim 14, wherein the SPP software includes a list of third-party software applications that have software templates that correspond to each third-party software application.

19. The method of claim 14, further comprising the step of translating data generated by one or more third-party software applications using the SPP software for transmission to the vehicle telematics unit over the short-range wireless link.

20. The method of claim 14, further comprising the step of controlling one or more third-party software applications on the wireless device via the short-range wireless link using the SPP software application and one or more software templates.

* * * * *